US011546527B2

(12) United States Patent
Werblin et al.

(10) Patent No.: US 11,546,527 B2
(45) Date of Patent: *Jan. 3, 2023

(54) METHODS AND APPARATUSES FOR COMPENSATING FOR RETINITIS PIGMENTOSA

(71) Applicant: Irisvision, Inc., Pleasanton, CA (US)

(72) Inventors: Frank Werblin, Berkeley, CA (US); Ammad Khan, Dublin, CA (US)

(73) Assignee: Irisvision, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,098

(22) Filed: Jul. 3, 2019

(65) Prior Publication Data

US 2020/0112691 A1 Apr. 9, 2020

Related U.S. Application Data

(60) Provisional application No. 62/694,173, filed on Jul. 5, 2018.

(51) Int. Cl.
*H04N 13/332* (2018.01)
*H04N 13/139* (2018.01)
*H04N 5/262* (2006.01)
*H04N 7/18* (2006.01)

(52) U.S. Cl.
CPC ............. *H04N 5/2628* (2013.01); *H04N 7/18* (2013.01)

(58) Field of Classification Search
CPC .............................. H04N 5/2628; H04N 7/18
USPC ........................................................... 348/62
See application file for complete search history.

(56) References Cited

U.S. PATENT DOCUMENTS

| 4,461,551 A | 7/1984 | Blaha |
| 4,586,892 A | 5/1986 | Ichizawa |
| 4,634,243 A | 1/1987 | Massof |
| 4,751,507 A | 6/1988 | Hama |
| 4,848,898 A | 7/1989 | Massof |
| 4,856,892 A | 8/1989 | Ben-Tovim |
| 5,151,722 A | 9/1992 | Massof |
| 5,359,675 A | 10/1994 | Siwoff |
| 5,717,834 A | 2/1998 | Werblin |
| 5,719,593 A | 2/1998 | De Lange |
| 5,808,589 A | 9/1998 | Fergason |
| 5,933,082 A | 8/1999 | Abita |
| 6,061,064 A | 5/2000 | Reichlen |

(Continued)

FOREIGN PATENT DOCUMENTS

| CN | 103110401 A | 5/2013 |
| CN | 104688179 A | 6/2015 |

(Continued)

OTHER PUBLICATIONS

International Search Report for PCT/US20/40726, dated Sep. 14, 2020.

(Continued)

*Primary Examiner* — Albert Kir
(74) *Attorney, Agent, or Firm* — Novel IP (57) ABSTRACT

A system and methods for compensating for retinitis pigmentosa for a user include using a head-mounted and user-controllable device that can minify the image to more closely match the user's reduced field of view. The user may adjust the amount of minification and may also adjust the magnification of the image.

16 Claims, 5 Drawing Sheets

(56) References Cited

U.S. PATENT DOCUMENTS

| | | | |
|---|---|---|---|
| 6,067,112 | A | 5/2000 | Wellner |
| 6,529,331 | B2 | 3/2003 | Massof |
| 6,545,685 | B1 | 4/2003 | Dorbie |
| 6,590,583 | B2 | 7/2003 | Soohoo |
| 6,591,008 | B1 | 7/2003 | Surve |
| 6,704,034 | B1 | 3/2004 | Rodriguez |
| 6,766,041 | B2 | 7/2004 | Golden |
| 6,889,006 | B2 | 5/2005 | Kobayashi |
| 7,486,302 | B2 | 2/2009 | Shoemaker |
| 7,522,344 | B1 | 4/2009 | Curatu |
| 7,542,210 | B2 | 6/2009 | Chirieleison, Sr. |
| 7,612,804 | B1 | 11/2009 | Marcu |
| 7,806,528 | B2 | 10/2010 | Bedell |
| 7,883,210 | B2 | 2/2011 | Filar |
| 8,103,352 | B2 | 1/2012 | Fried |
| 8,239,031 | B2 | 8/2012 | Fried |
| 8,253,787 | B2 | 8/2012 | Yamamoto |
| 8,311,328 | B2 | 11/2012 | Spruck |
| 8,350,898 | B2 | 1/2013 | Chang |
| 8,454,166 | B2 | 6/2013 | Fateh |
| 8,490,194 | B2 | 7/2013 | Moskovitch |
| 8,511,820 | B2 | 8/2013 | Trachtman |
| 8,516,584 | B2 | 8/2013 | Moskovitch |
| 8,571,670 | B2 | 10/2013 | Fried |
| 8,725,210 | B2 | 5/2014 | Yang |
| 8,760,569 | B2 | 6/2014 | Yang |
| 8,798,453 | B2 | 8/2014 | Lawton |
| 8,836,778 | B2 | 9/2014 | Ignatovich |
| 8,862,183 | B2 | 10/2014 | Kulas |
| D717,856 | S | 11/2014 | Slawson |
| 8,879,813 | B1 * | 11/2014 | Solanki ............... G06V 40/193 382/128 |
| 8,888,288 | B2 | 11/2014 | Iravani |
| 8,905,543 | B2 | 12/2014 | Davis |
| 8,922,366 | B1 | 12/2014 | Honoré et al. |
| 8,976,247 | B1 | 3/2015 | Karner |
| 9,019,420 | B2 | 4/2015 | Hurst |
| 9,031,610 | B2 | 5/2015 | Kulas |
| 9,066,683 | B2 | 6/2015 | Zhou |
| 9,149,179 | B2 | 10/2015 | Barnard |
| 9,213,185 | B1 | 12/2015 | Starner |
| 9,215,977 | B2 | 12/2015 | Kohn Bitran |
| 9,545,422 | B2 | 1/2017 | Greenberg |
| 9,706,918 | B2 | 7/2017 | Myung |
| 9,891,435 | B2 | 2/2018 | Boger |
| 10,092,182 | B2 | 10/2018 | Myung |
| 10,146,304 | B2 | 12/2018 | Werblin |
| 10,188,294 | B2 | 1/2019 | Myung |
| D848,420 | S | 5/2019 | Boger |
| 10,345,591 | B2 | 7/2019 | Samec |
| D863,300 | S | 10/2019 | Boger |
| 10,444,833 | B2 | 10/2019 | Werblin |
| 10,488,659 | B2 | 11/2019 | Boger |
| 10,613,323 | B1 | 4/2020 | Wheelwright |
| 10,743,761 | B2 | 8/2020 | Myung |
| 2002/0101568 | A1 | 8/2002 | Eberl |
| 2002/0181115 | A1 | 12/2002 | Massof |
| 2003/0182394 | A1 | 9/2003 | Ryngler |
| 2004/0136570 | A1 | 7/2004 | Ullman |
| 2004/0208343 | A1 | 10/2004 | Golden |
| 2005/0162512 | A1 | 7/2005 | Seakins |
| 2005/0200707 | A1 | 9/2005 | Yogesan |
| 2005/0237485 | A1 | 10/2005 | Blum |
| 2005/0270484 | A1 | 12/2005 | Maeda |
| 2006/0129207 | A1 | 6/2006 | Fried |
| 2006/0167530 | A1 | 7/2006 | Flaherty |
| 2006/0282129 | A1 | 12/2006 | Fried |
| 2006/0290712 | A1 | 12/2006 | Hong |
| 2007/0106143 | A1 | 5/2007 | Flaherty |
| 2007/0198941 | A1 | 8/2007 | Baar |
| 2007/0235648 | A1 | 10/2007 | Teich |
| 2007/0280677 | A1 | 12/2007 | Drake |
| 2007/0294768 | A1 | 12/2007 | Moskovitch |
| 2008/0106489 | A1 | 5/2008 | Brown |
| 2008/0184371 | A1 | 7/2008 | Moskovitch |
| 2008/0238947 | A1 | 10/2008 | Keahey |
| 2008/0247620 | A1 | 10/2008 | Lewis |
| 2008/0278821 | A1 | 11/2008 | Rieger |
| 2009/0059364 | A1 | 3/2009 | Brown |
| 2009/0062686 | A1 | 3/2009 | Hyde |
| 2009/0322859 | A1 | 12/2009 | Shelton |
| 2010/0016730 | A1 | 1/2010 | Tanaka |
| 2010/0079356 | A1 | 4/2010 | Hoellwarth |
| 2010/0283800 | A1 | 11/2010 | Cragun |
| 2010/0328420 | A1 | 12/2010 | Roman |
| 2011/0085138 | A1 | 4/2011 | Filar |
| 2011/0102579 | A1 | 5/2011 | Sung |
| 2011/0221656 | A1 | 9/2011 | Haddick |
| 2011/0224145 | A1 | 9/2011 | Greenberg |
| 2011/0241976 | A1 | 10/2011 | Boger |
| 2011/0299036 | A1 | 12/2011 | Goldenholz |
| 2012/0062840 | A1 | 3/2012 | Ballou, Jr. |
| 2012/0176689 | A1 | 7/2012 | Brown |
| 2012/0194550 | A1 | 8/2012 | Osterhout |
| 2012/0212594 | A1 | 8/2012 | Barnes |
| 2012/0229617 | A1 | 9/2012 | Yates |
| 2012/0242678 | A1 | 9/2012 | Border |
| 2012/0249797 | A1 | 10/2012 | Haddick |
| 2012/0262558 | A1 | 10/2012 | Boger |
| 2012/0277826 | A1 | 11/2012 | Fried |
| 2012/0316776 | A1 | 12/2012 | Brown |
| 2012/0320340 | A1 | 12/2012 | Coleman, III |
| 2013/0050273 | A1 | 2/2013 | Fujimura |
| 2013/0083185 | A1 | 4/2013 | Coleman, III |
| 2013/0110236 | A1 * | 5/2013 | Nirenberg ............... A61F 9/08 623/6.63 |
| 2013/0127980 | A1 | 5/2013 | Haddick |
| 2013/0128364 | A1 | 5/2013 | Wheeler |
| 2013/0150123 | A1 | 6/2013 | Kulas |
| 2013/0242262 | A1 | 9/2013 | Lewis |
| 2013/0293840 | A1 | 11/2013 | Bartels |
| 2013/0300919 | A1 | 11/2013 | Fletcher |
| 2013/0329190 | A1 | 12/2013 | Lewis |
| 2014/0002792 | A1 | 1/2014 | Filar |
| 2014/0071547 | A1 | 3/2014 | O'Neill |
| 2014/0078594 | A1 | 3/2014 | Springer |
| 2014/0085603 | A1 | 3/2014 | Su |
| 2014/0098120 | A1 | 4/2014 | Ritts |
| 2014/0114208 | A1 | 4/2014 | Smith |
| 2014/0132932 | A1 | 5/2014 | Jung |
| 2014/0192022 | A1 | 7/2014 | Yamamoto |
| 2014/0218193 | A1 | 8/2014 | Huston |
| 2014/0228668 | A1 | 8/2014 | Wakizaka |
| 2014/0268053 | A1 | 9/2014 | Fabian |
| 2014/0327753 | A1 | 11/2014 | Prabhakar |
| 2014/0327754 | A1 | 11/2014 | Prabhakar |
| 2014/0327755 | A1 | 11/2014 | Prabhakar |
| 2014/0350379 | A1 | 11/2014 | Verdooner |
| 2015/0002950 | A1 | 1/2015 | O'Neill |
| 2015/0042873 | A1 | 2/2015 | Hunt |
| 2015/0045012 | A1 | 2/2015 | Siminou |
| 2015/0077565 | A1 | 3/2015 | Karner |
| 2015/0098060 | A1 | 4/2015 | Zhou |
| 2015/0103317 | A1 | 4/2015 | Goldfain |
| 2015/0104087 | A1 | 4/2015 | Katuwal |
| 2015/0138048 | A1 * | 5/2015 | Park ............... A61F 9/02 345/8 |
| 2015/0169531 | A1 | 6/2015 | Campbell |
| 2015/0223678 | A1 | 8/2015 | Goldfain |
| 2015/0223686 | A1 | 8/2015 | Wang |
| 2015/0234189 | A1 * | 8/2015 | Lyons ............... A63F 13/26 345/174 |
| 2015/0254524 | A1 | 9/2015 | Dickrell, III |
| 2015/0257639 | A1 | 9/2015 | Manquez Hatta |
| 2015/0313462 | A1 | 11/2015 | Reis |
| 2015/0320313 | A1 | 11/2015 | Stamile |
| 2015/0339589 | A1 | 11/2015 | Fisher |
| 2015/0346348 | A1 | 12/2015 | Liu |
| 2015/0348327 | A1 | 12/2015 | Zalewski |
| 2016/0015264 | A1 | 1/2016 | Pankajakshan |
| 2016/0045388 | A1 | 2/2016 | Krenik |
| 2016/0048203 | A1 | 2/2016 | Blum |
| 2016/0051142 | A1 | 2/2016 | Howes |
| 2016/0063893 | A1 | 3/2016 | Kanuganti |

(56) References Cited

U.S. PATENT DOCUMENTS

| | | | |
|---|---|---|---|
| 2016/0097930 A1 | 4/2016 | Robbins | |
| 2016/0104453 A1 | 4/2016 | Borenstein | |
| 2016/0113489 A1 | 4/2016 | Myung | |
| 2016/0156850 A1* | 6/2016 | Werblin | G02B 27/017 348/63 |
| 2016/0173752 A1 | 6/2016 | Caviedes | |
| 2016/0264051 A1 | 9/2016 | Werblin | |
| 2016/0314564 A1 | 10/2016 | Jones | |
| 2016/0379593 A1 | 12/2016 | Borenstein | |
| 2017/0172675 A1 | 6/2017 | Jarc | |
| 2017/0200296 A1* | 7/2017 | Jones | G06F 40/58 |
| 2017/0236332 A1* | 8/2017 | Kipman | G06F 3/016 345/633 |
| 2017/0280996 A1 | 10/2017 | Myung | |
| 2018/0017820 A1* | 1/2018 | Cheng | G02B 27/0068 |
| 2018/0116509 A1 | 5/2018 | Myung | |
| 2018/0125716 A1 | 5/2018 | Cho | |
| 2018/0144554 A1* | 5/2018 | Watola | G06T 19/006 |
| 2018/0239137 A1 | 8/2018 | Boger | |
| 2018/0239425 A1* | 8/2018 | Jang | G02B 27/017 |
| 2018/0330169 A1* | 11/2018 | van Hoof | G06V 20/46 |
| 2019/0056783 A1 | 2/2019 | Werblin | |
| 2019/0094552 A1* | 3/2019 | Shousha | G02B 27/0179 |
| 2019/0180421 A1 | 6/2019 | Kim | |
| 2019/0208186 A1 | 7/2019 | Kawabe | |
| 2019/0222817 A1* | 7/2019 | Abou Shousha | G06K 9/0061 |
| 2019/0251672 A1* | 8/2019 | Lim | G06T 5/002 |
| 2019/0251679 A1 | 8/2019 | Werblin | |
| 2019/0302886 A1 | 10/2019 | Werblin | |
| 2020/0008673 A1 | 1/2020 | Myung | |
| 2021/0153741 A1 | 5/2021 | Berdahl | |
| 2021/0271318 A1* | 9/2021 | Bradley | G02B 27/0172 |
| 2021/0290056 A1 | 9/2021 | Karandikar | |
| 2021/0373656 A1* | 12/2021 | Watola | G06F 3/013 |
| 2022/0094854 A1* | 3/2022 | Gong | H04N 5/2628 |
| 2022/0256133 A1* | 8/2022 | Routhier | H04N 13/239 |

FOREIGN PATENT DOCUMENTS

| | | |
|---|---|---|
| EP | 2621169 A1 | 7/2013 |
| JP | 2004279733 A | 10/2004 |
| JP | 2005524462 A | 8/2005 |
| JP | 2006212102 A | 8/2006 |
| JP | 2007178409 | 7/2007 |
| JP | 2007520243 A | 7/2007 |
| JP | 2008093118 A | 4/2008 |
| JP | 2008295725 A | 12/2008 |
| JP | 2009031685 | 2/2009 |
| JP | 2013104986 A | 5/2013 |
| JP | 2013125038 | 6/2013 |
| WO | 1992008157 A1 | 5/1992 |
| WO | 1995006288 A2 | 3/1995 |
| WO | 1998044468 A1 | 10/1998 |
| WO | 2002086590 A1 | 10/2002 |
| WO | 2002099597 A2 | 12/2002 |
| WO | 03043363 A1 | 5/2003 |
| WO | 2007069294 A1 | 6/2007 |
| WO | 2008055262 A2 | 5/2008 |
| WO | 2011159757 A2 | 12/2011 |
| WO | 2012142202 A1 | 10/2012 |
| WO | 2012176960 A1 | 12/2012 |
| WO | 2014181096 A1 | 11/2014 |
| WO | 2014194182 A1 | 12/2014 |
| WO | 2015035229 A2 | 3/2015 |
| WO | 2015054672 A1 | 4/2015 |
| WO | 2015071779 A1 | 5/2015 |
| WO | 2016077343 A1 | 5/2016 |
| WO | 2016144419 A1 | 9/2016 |
| WO | 2016205709 A1 | 12/2016 |
| WO | 2018053509 A1 | 3/2018 |
| WO | 2019094047 A1 | 5/2019 |
| WO | 2019160962 A1 | 8/2019 |

OTHER PUBLICATIONS

Written Opinion of the International Searching Authority for PCT/US20/40726, dated Sep. 14, 2020.

Web Search History for U.S. Appl. No. 16/447,481, filed Sep. 10, 2020.

Chen-Yung Hsu and Mark M. Uslan; When is a Little Magnification Enough? A Review of Microsoft Magnifier, AccessWorld Magazine, Jul. 2000, vol. 1, No. 4.

Richard D. Juday and David S. Loshin; Some Examples of Image Warping for Low Vision Prosthesis; Speidigitallibrary.org, Aug. 22, 1988.

Google Search of How to Install and Use Microsoft Magnifier, Mar. 29, 2018.

Gergely VASS and Tama PERLAKI; Applying and removing lens distortion in post production, Colorfront Ltd., Budapest, 2003.

Eric Kenneth Victorson; A Head Mounted Digital Image Warping Prosthesis for Age-Related Macular Degeneration; U of Minn., May 2014.

International Search Report for PCT/US15/59950, dated Apr. 11, 2016.

Written Opinion of the International Searching Authority for PCT/US15/59950, dated Apr. 11, 2016.

International Search Report for PCT/US16/12135, dated Apr. 29, 2016.

Written Opinion of the International Searching Authority for PCT/US16/12135, dated Apr. 29, 2016.

International Search Report for PCT/US19/17860, dated May 14, 2019.

Written Opinion of the International Searching Authority for PCT/US19/17860, dated May 14, 2019.

Sample et al.; "Imaging and Perimtery Society Standards and Guidelines" Optometry and Vision Science, vol. 88, No. 1, Jan. 2011, pp. 4-7.

International Search Report for PCT/US21/22491, dated Aug. 12, 2021.

Written Opinion of the International Searching Authority for PCT/US21/22491, dated Aug. 12, 2021.

Stelmack, et al. "Is there a standard of care for eccentric viewing training?" Journal of Rehabilitation Research & Development; vol. 41, No. 5, pp. 729-738; Sep./Oct. 2004.

Hassan, et al. "Changes in the Properties of the Preferred Retinal Locus with Eccentric Viewing Training", Optom Vis Sci 2019;96:79-86. doi: 10.1097/OPX.0000000000001324.

International Search Report for PCT/US16/38176, dated Sep. 7, 2016.

GITHUB; RNCryptor/RNCryptor; 7 pages; retrieved from the internet (https://github.com/RNCryptor/RNCryptor).

Haddock et al.; Simple, inexpensive technique for high-quality smartphone fundus photography in human and animal eyes; Journal of Opththalmology; 2013; pp. 1-5; published online Sep. 19, 2013.

Hester et al.; Smart Phoneography—how to take slit lamp photographs with an iphone; 12 pages; retrieved from internet (http://eyewiki.aao.org/Smart_Phoneography_-_How_to_take_slit_lamp_photographs_with_an_iPhone).

Kim et al.; Smartphone photography safety; Ophthalmology; 119(10); pp. 220-2201; Oct. 2012.

Lord et al.; Novel uses of smartphones in ophthalmology; Ophthalmology; 117(6); pp. 1274-1274 e3; Jun. 2010.

Teichman et al.; From iphone to eyephone: a technique for photodocumentation; Can. J. Ophthalmol.; 46(3); pp. 284-286; Jun. 2011.

Wikipedia: Soap note; 6 pages; retreived from the interet (http://en.wikipedia.org/wiki/SOAP_note).

Apple Developer; Apple app store connect user guide; 4 pages; retrieved from the internet (https://developer.apple.com/support/ap-store-connect/).

Bastawrous; Smartphone fundoscopy; Ophthalmology; 119(2); pp. 432-433. e2; Feb. 2012.

(56) References Cited

OTHER PUBLICATIONS

Chakrabarti; Application of mobile technology in ophthalmology to meet the demands of low-resource settings; Journal of Mobile Technology in Medicine; 1(4S); pp. 1-3; Dec. 2012.
Chhablani et al.; Smartphones in ophthalmology; Indian J. Ophthalmol.; 60(2); pp. 127-131; Mar./Apr. 2012 (Author Manuscript).
Echanique et al.; Ocular Cellscope; University of California at Berkeley; Electrical engineering and computer sciences; 23 pages; retrieved from the internet (http://digitalassets.lib.berkeley.edu/techreports/ucb/text/EECS-2014-91.pdf); May 16, 2014.
GITHUB; Nicklockwood/iCarousel; A simple, highly customisable, data-driven 3D carousel for iOS and Mac OS; 30 pages; retrieved from teh internet (https://github.com/nicklockwood/iCarousel).
GITHUB; Project-imas / encrypted-core-data; 6 pages; retrieved from the internet (https://github.com/project-imas/encrypted-core-data);.
Smythies, John; "A note on the concept of the visual field in neurology, psychology, and visual neuroscience", Perception, 1996, vol. 25, pp. 369-371.

\* cited by examiner

METHODS AND APPARATUSES FOR COMPENSATING FOR RETINITIS PIGMENTOSA

CROSS-REFERENCE TO RELATED APPLICATIONS

This application claims the benefit of U.S. Provisional Application No. 62/694,173 filed Jul. 5, 2018, the contents of which are hereby incorporated by reference in its entirety.

BACKGROUND OF THE INVENTION

Field of the Invention

The present invention generally relates to a vision-enhancement system and methods, and, more particularly, to a head-mounted and user-controllable method and system for vision-enhancement and a system and method for configuring a vision-enhancement system to compensate for those suffering from retinitis pigmentosa.

Discussion of the Background

The normal human visual system establishes a non-magnified representation of a scene in the visual periphery with a high-resolution representation at the center of the visual field. Thus, the cornea and lens of the eye focuses a viewed scene onto the retina, which includes the fovea near the center of vision, and a peripheral area. The fovea is a small area composed of closely packed cones near the center of the macula lutea of the retina. The fovea is responsible for sharp central vision which is necessary for activities where visual detail is of primary importance, such as reading and driving.

The fovea is greatly expanded at the visual cortex and represents a significant magnification mechanism that allows a normally sighted person to discern the region of the visual world that is in "focus" on (faces, titles of dish soap, text), but sees that region in the broad context of an overall visual field.

People with retinitis pigmentosa (referred to herein as "RP") suffer from "tunnel vision" with an accompanying reduction in the ability to capture enough light in low light situations (i.e., dusk, nighttime, theaters, and the like) to be able to navigate safely. These people retain central vision but lose most peripheral vision. In normal daylight situations, the effect of RP is to easily swamp the vision during normal sunlight to the point that the visual scene is obscured. The visual field can be as narrow as 1 degree (the width of your thumb at arm's length). Such people have difficulty with mobile activities such as navigating and recognizing both people and objects at a distance and can have difficulty reading. These disabilities greatly diminish their quality of life, greatly limiting their ability to socialize, shop, cook and travel.

Traditionally, the effects or RP may be compensated using an optical or digital "reverse telescope." This solution, however, is inadequate because the magnification, field and focus point is fixed. The person is restricted to using the same parameters for all situations. This limits the utility of the device and its value to those suffering from RP.

Thus, there is a need in the art for a method and apparatus that permits for enhanced representation of the visual world that also enables mobility for navigation and recognition. The methods and apparatus should be easy to use, allow the user to control what is being viewed, and be inexpensive.

BRIEF SUMMARY OF THE INVENTION

The present invention overcomes the limitations and disadvantages of prior art vision-enhancement systems and methods by providing the user with a head-mounted, user-adjustable field of view system that provides enhancements for various low vision problems.

It is one aspect to provide a device that can present to the user, in real-time, an enhanced video image of a scene surrounding the user so that the user can perform routine tasks. Certain embodiments include: 1) a head-mounted video camera that can obtain an input stream of video images of the scene in front of the user's head; 2) a processor to process the stream of input video images into a stream of output images that corrects for the user's vision deficiencies; and 3) a display for the processed video images that is viewable by the user. In certain embodiments, the system presents an image of adjustable size and presents a scene within a smaller field of view than what would be viewed with normal vision.

It is another aspect to provide a wearable and portable vision-enhancement system for persons suffering from RP. The system includes a memory including a stored program; a camera mounted on the user aimed to view the scene in front of the user's head and operable to obtain input video images of the scene; a processor programmed to execute the stored program to transform the input video images into a stream of output video images. In one embodiment, the transformation from input video images results in output video images that occupy a smaller field of view than uncorrected vision. In effect, the system provides a zoomed-out version of the input images similar to looking through the "wrong" end of a telescope. The zoomed-out images are referred to herein as being "minified," which is the opposite of being magnified. This minified view gives the patient a smaller field of view that can be "scanned" with the patient's limited (often 1 degree) visual field. The program is also operable in response to a command by the patient after viewing the minified contextual scene to magnify within the smaller FOV so as to focus in on a particular feature of the scene (another person's face, a label on a package, title of a book, etc.).

It is one aspect to provide a portable vision-enhancement system wearable by a user. The system includes: a memory including a stored program; a camera mounted on the user aimed to view the scene in front of the user and operable to obtain input video images of the scene; a processor programmed to execute the stored program to change the input video images into a stream of output video images; a screen disposed to display the output video images for viewing by the user; and a user-operable controller for generating an input to the processor by which the size of the output video images are adjusted.

It is another aspect to provide a method for compensating for retinitis pigmentosa for a user using a system including a camera, a processor, and a screen. The method includes: accepting a stream of video images from the camera; processing the accepted stream of video images in the processor into a stream of output video images; and accepting an input from the user to adjust the size of the output video images on the screen.

These features, together with the various ancillary provisions and features which will become apparent to those skilled in the art from the following detailed description, are attained by the vision-enhancement system and method of the present invention, preferred embodiments thereof being shown with reference to the accompanying drawings, by way of example only, wherein:

BRIEF DESCRIPTION OF THE SEVERAL VIEWS OF THE DRAWING

FIGS. 1A, 1B, and 1C show a first embodiment user-controllable vision-enhancement system, where FIG. 1A shows the system on a user.

Reference symbols are used in the figures to indicate certain components, aspects or features shown therein, with reference symbols common to more than one figure indicating like components, aspects or features shown therein.

DETAILED DESCRIPTION OF THE INVENTION

Certain embodiments of the inventive vision-enhancement system described herein include: 1) a video camera to capture the scene that would be in the user's field of view if the user was not wearing the system; 2) a processor to image process the video of the captured scene; and 3) a screen to present the processed video images to the user's eyes. The modified video image compensates for the user's particular vision problem, such as tunnel vision, by providing more of the central image of interest to the more active, less impacted portions of the user's eyes, while retaining the peripheral context of the scene. Thus, the image of the of the scene is presented to the user according to an image transformation that maps the captured image, pixel-by-pixel, to an image that presents a smaller field of view than if it were viewed without the system and is thus more useful to the user.

In one embodiment, minified images are presented to the user of the vision-enhancement system. The term "minified" is used to denote an output image that is a zoomed out version of the input images. Thus, for example, a scene that would be viewed without enhancement over a 70-degree field of view is reduced in size so that the same scene is viewed within a smaller field of view, such as, for example and without limitation, a 35 degrees. A minified image is similar to the effect of looking through the "wrong" end of a telescope and is the opposite of being magnified. This minified view gives the patient suffering from RP a contextual view of the scene. The image-processed video modifies a scene in a way that allows the user to more easily recognize people or identify items in their surroundings. Thus, the user may be able to identify items on the supermarket shelf, recognize friends and neighbors, read street signs, and sit in an armchair to read a book. In other embodiments, the user is also able to magnify or zoom in to the image to allow greater detail to be discerned.

Figure 1A:
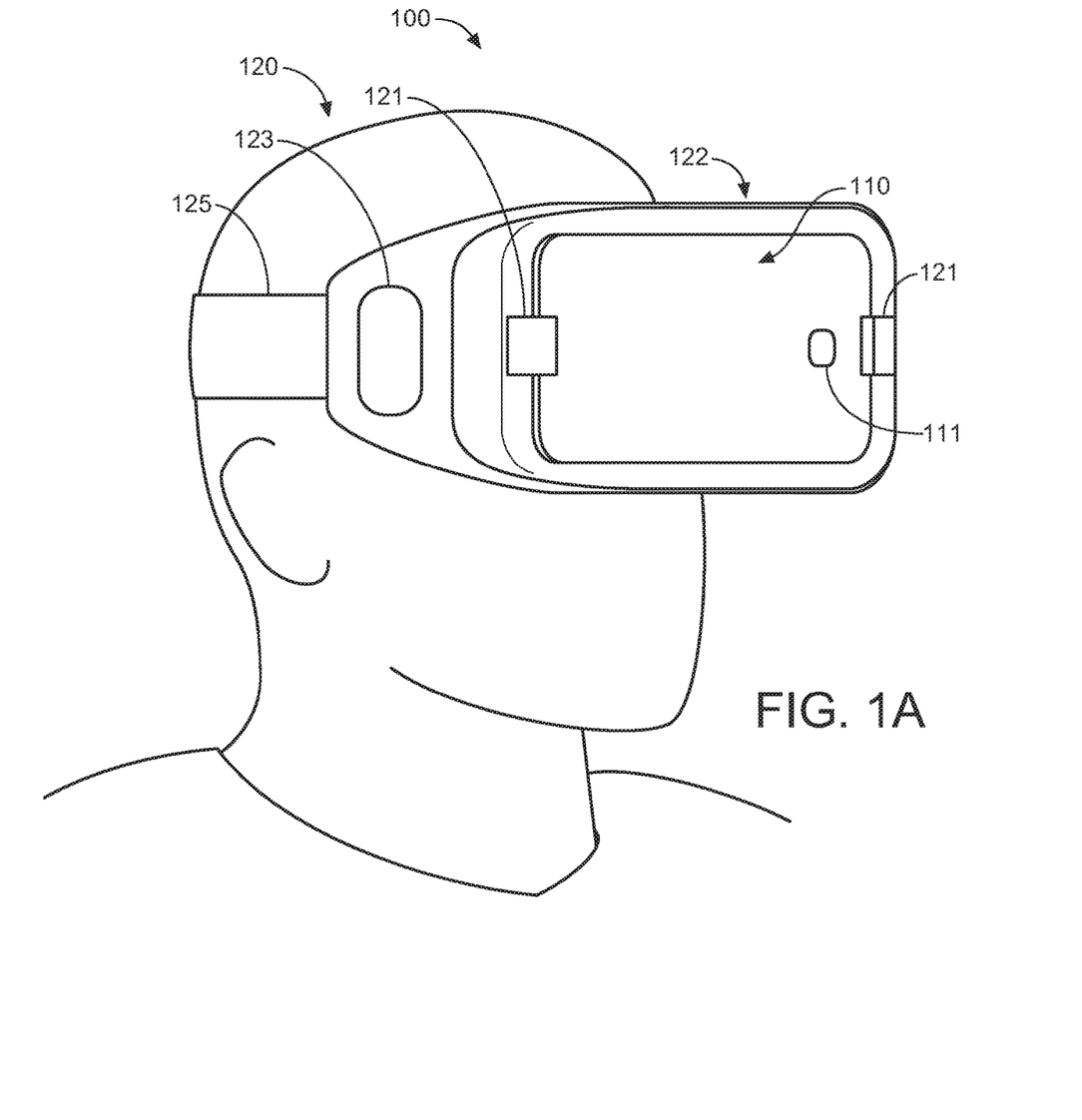
Figure 1B:
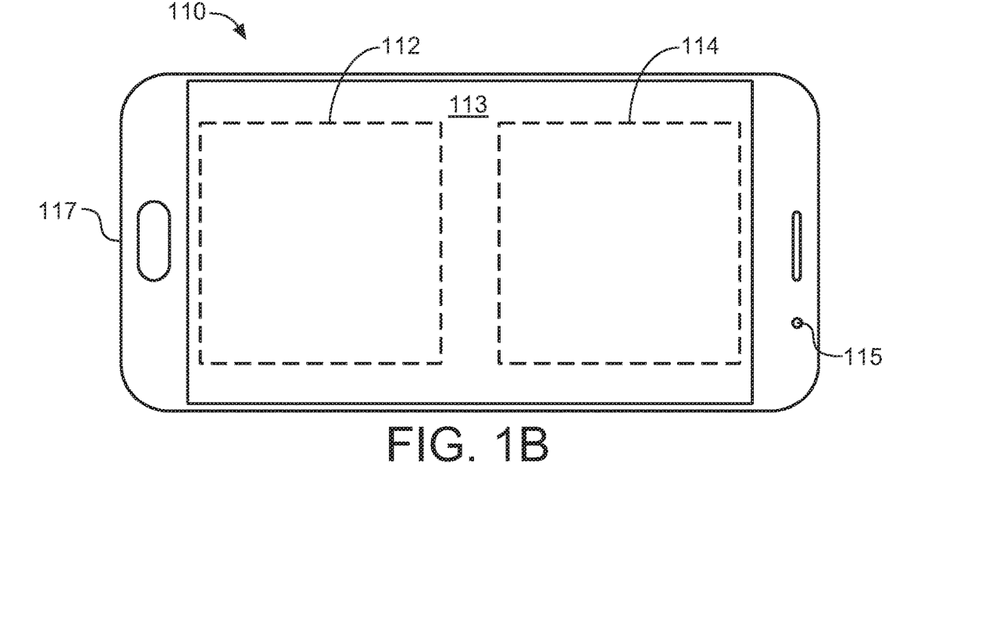
FIG. 1B shows a smartphone used in the system and FIG. 1C shows the body of the goggle used in the system.
Figure 1C:
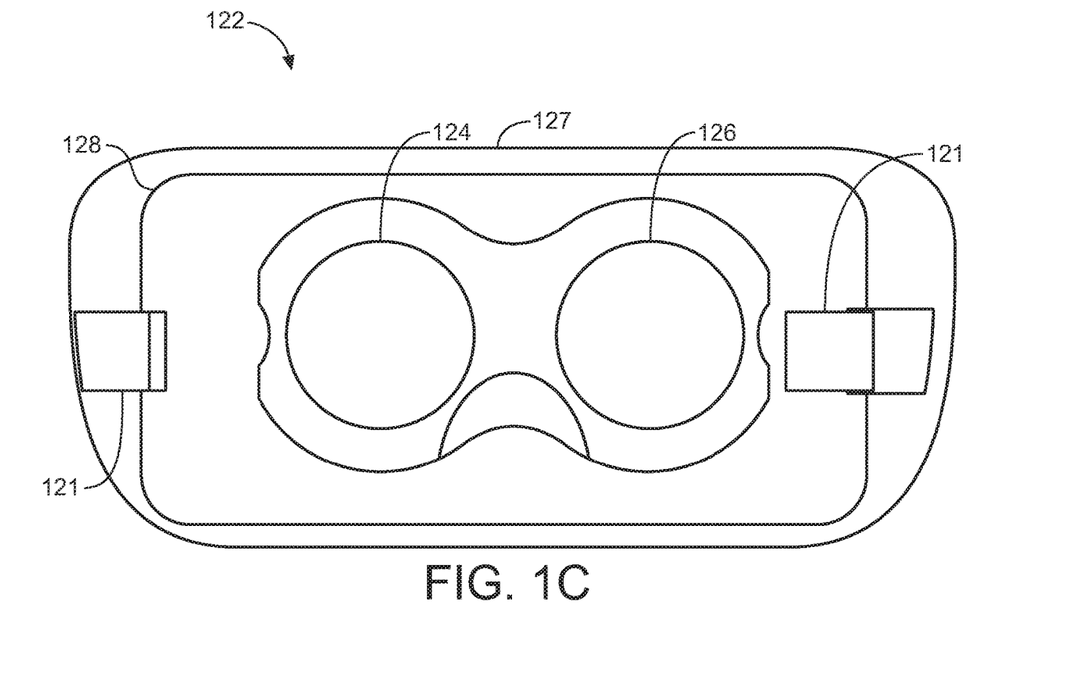

By way of a specific embodiment, FIGS. 1A, 1B, and 1C show a first embodiment user-controllable vision-enhancement system 100, where FIG. 1A shows the system on a user, FIG. 1B shows a smartphone used in the system and FIG. 1C shows the body of the goggle used in the system. System 100 includes a smartphone 110 supported in headset 120. Smartphone 110 includes the electronics necessary for the vision-enhancement system 100, including a processor and memory (not shown), a forward-facing camera 111, as shown in FIG. 1A, and a screen 113 on the side opposite the camera, as shown in FIG. 1B. Smartphone 110 also includes an electrical connector 117 and may also include a backward-facing camera 115, which may be used in certain embodiments. As described subsequently, processed camera images are displayed on one portion of screen 113 shown as a left area 112 and a second portion of the screen shown as a right area 114.

Headset 120 include a body 122 and a strap 125 for holding the headset on the user's head and a connector 128 that mates with smartphone connector 117. Body 122 includes, as shown in FIG. 1A, a pair of clamps 121 for removably restraining smartphone 110 and making the electrical connection between connectors 117 and 128, and input device 123 for providing input to the smartphone through the connectors and, as shown in FIG. 1C, a left lens 124 and right lens 126 and a focusing wheel 127. When assembled as in FIG. 1A, with smartphone 110 held in place by clamps 121, system 100 presents what is displayed in area 112 of screen 113, through lens 124, to the user's left eye, and what is displayed in area 114 of the screen, through lens 126, to the user's right eye. The user may use focusing wheel 127 to adjust the focus. In certain embodiments, headset 120 are adapted to accept user input from input device 123, which may control or otherwise provide inputs to the accepted smartphone 110.

In certain embodiments, smartphone 110 is provided with programming, as through a vision-enhancement application (referred to herein as a "VE App") which can: 1) operate camera 111 in a video mode to capture a stream of "input images"; 2) perform image processing on each input image to generate a stream of "output images"; and 3) present the stream of output images to screen 113. In certain embodiments, each of the stream of output images is presented sequentially side-by-side as two identical images—one in area 112 and one in area 114. Further, it is preferred that vision-enhancement system 100 operate so that the time delay between when the input images are obtained and when the output images are provided to screen 113 be as short as possible so that a user may safely walk and interact with the environment with headset 120 covering their eyes.

In certain embodiments, the VE App may also provide a menu of options that allow for the modification of how vision-enhancement system 100 generates an output image from an input image. Thus, for example, vision-enhancement system 100 may execute image-processing algorithms having parameters, where the parameters are changeable through the menu by, for example, setting parameter values for magnification, or the size and shape of magnification of the output image.

Vision-enhancement system 100 has adjustable features that allow it to match the physiology of the user for use in different settings. These features are generally set once for each user, possibly with the need for periodic adjustment. Thus, for example, given the spacing between screen 113 and the eyes of user U, focusing wheel 127 permits for an optimal setting of the distance to lenses 124 and 126. In addition, lenses 124 and/or 126 may include refractive error correction. Further, it is important that the viewed spacing between the images in areas 112 and 114 match the user's interpupillary distance (IPD). This may be accounted for, by example, by shifting the spacing of the output images in areas 112 and 114 to match the IPD.

In various embodiments, the user may adjust settings using input device 123, which may be a touchpad, and which is electrically connected to smartphone 110, which is further programmed to modify the VE App according to such inputs; a Bluetooth game controller that communicates with the smartphone 110 via Bluetooth; voice control using the microphone of the phone; or gesture control using available devices such as the NOD gesture control ring (see, for example, http://techcrunch.com/2014/04/29/nod-Bluetooth-gesture-control-ring/).

In addition, there are other features of vision-enhancement system 100 that can either be set up once for a user or may be user-adjustable. These features may include, but are not limited to, adjustments to the magnitude, shape, size, or placement of minified or magnified portions of the output image, and color enhancement functions such as contrast, blur, ambient light level or edge enhancement of the entire image or portions of the image. In other embodiments, the compass and/or accelerometers within smartphone 110 may be used for enhancing orientation, location, or positioning of output images.

In certain embodiments, sound and/or vibration may be provided on smartphone 110 to generate for proximity and hazard cues. In other embodiments, the microphone of smartphone 110 can be used to enter voice commands to modify the VE App. In certain other embodiments, image stabilization features or programming of smartphone 110 are used to generate output images.

In one embodiment, by way of example only, headset 120 are commercially available virtual-reality headset, such as Samsung Gear VR (Samsung Electronics Co. Ltd., Ridgefield Park, N.J.) and smartphone 110 is a Galaxy Note 4 (Samsung Electronics Co. Ltd., Ridgefield Park, N.J.). The Samsung Gear VR includes a micro USB to provide an electrical connection to the Galaxy Note 4 and has as input devices 123 a touch pad and buttons.

It will be understood by those in the field that vision-enhancement system 100 may, instead of including a combination of smartphone and headset, be formed from a single device which includes one or more cameras, a processor, display device, and lenses that provide an image to each eye of the user. In an alternative embodiment, some of the components are head-mounted and the other components are in communication with the head-mounted components using wired or wireless communication. Thus, for example, the screen and, optionally the camera, may be head-mounted, while the processor communicates with the screen and camera using wired or wireless communication.

Further, it will be understood that other combinations of elements may form the vision-enhancement system 100. Thus, an electronic device which is not a smartphone, but which has a processor, memory, camera, and display may be mounted in headset 120. Alternatively, some of the electronic features described as being included in smartphone 110 may be included in headset 120, such as the display or communications capabilities. Further, the input control provided by input device 123 may be provided by a remote-control unit that is in communication with smartphone 110.

Figure 1D:
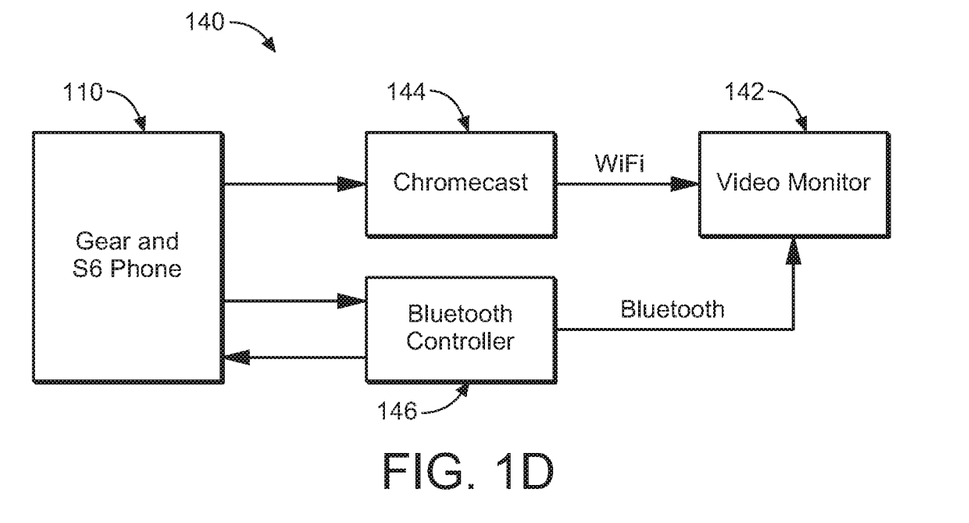
FIG. 1D shows a system which may be used to configure a vision-enhancement system.

FIG. 1D illustrates, without limitation, one embodiment of a clinical setup 140 that a clinician may user to configure vision-enhancement system 100. Clinical setup 140 may allow a clinician to determine and setup the VE App by setting an IPD, the field of view (fov), background dimming, ambient light level, as well as parameters that are also user-adjustable, such as the size, shape, magnification, and location of enhanced vision features.

Clinical setup 140 thus allows for the adjustment or parameters within or used by the VE App that smartphone 110 runs to implement the vision-enhancement system 100. Clinical setup 140 includes a monitor 142, a Wi-Fi device 144 to allow screen 113 of smartphone 110 to be displayed on the monitor, and a Bluetooth controller 146 to communicate via Bluetooth with smartphone 110. In general, clinical setup 140 accepts a video output from smartphone 110 of display 113 and projects what the user would see when using vision-enhancement system 110 on monitor 142.

In certain embodiments, features or aspects of the inventive vision-enhancement system 100 may be adjusted by a clinician using clinical setup 140. Using the setting up vision-enhancement system 100, screen 113 of smartphone 110 is mirrored on a monitor using Wi-Fi device 144, for example, so that the clinician can view what the user is viewing in vision-enhancement system 100. The VE App on smartphone 110 includes a menu that allows for the selection of certain parameters that operate vision-enhancement system 100.

The clinician has access to the commands in the menu of the VE App via remote Bluetooth controller 146. In this way, the clinician can "tune" the device to the specific visual demands of the user.

In certain embodiments, Wi-Fi device 144 can be used to remotely add, augment or modify functions to allow vision-enhancements, mirror the display, monitor and control VE App configurations in a clinical environment. In certain embodiments, Bluetooth controller 146 can be used to control or modify visual enhancement functions. In certain other embodiments, the VE App may be reconfigured in a purely magnified format, making it possible for the low vision user to place phone calls, utilize maps, read announcements and perform all visual functions currently available to those with normal vision.

Examples of functional control of vision-enhancement system 100 provided by clinical setup 140 through the operation of the VE App may include but are not limited to: 1) mirroring the user's display via Wi-Fi; and 2) controlling the minification and/or magnification of the output image. The clinician will have the facility to control the low vision parameters such as amount and placement of minification or magnification, contrast, edge enhancement ambient level and other visual enhancements to customize the device for the user.

Figure 2:
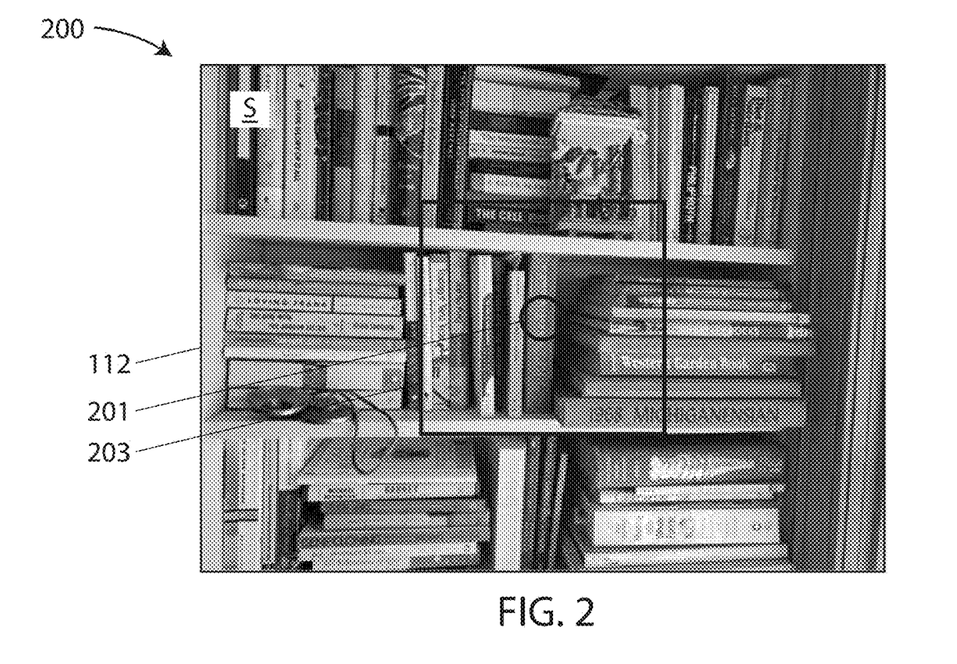
FIG. 2 shows an output image of a scene as would be presented to a user prior to being minified.

To better appreciate how the apparatus and methods described herein alter images for viewing, FIG. 2 presents an example of what a vision-enhancement system 100 displays without the VE App running—that is, what would be normally shown on the screen prior to minifying the image.

FIG. 2 illustrates an image 200 in area 112 which may be presented to one or both of display areas 112/114 prior to the alteration of the image as described herein. In general, image 200 is representative of any image or portion of an image captured by camera 111 and stored in the memory of smartphone 110. Image 200 includes an output image Sofa scene as the image of the scene prior to minification. Typically, an output image S occupies approximately 70 degrees when viewed by the user. That is, when area 112 is placed for viewing, the image presented subtends 70 degrees of the user's field of view.

For reference, FIG. 2 shows two portions of area 112 that are discussed in greater detail with reference to FIGS. 3 and 4. These portions are: 1) the outline of an output area 203 of area 112 into which the image S will modified for presentation; and 2) a circle representing a user's visual field 203 on area 112. The size of output area 203 is selectable by the user, the size of visual field 201 depends on the vision of the user, and the location of the visual field on area 112 depends on the gaze of the user—that is, it follows the movement of their eyes relative to the area.

Figure 3:
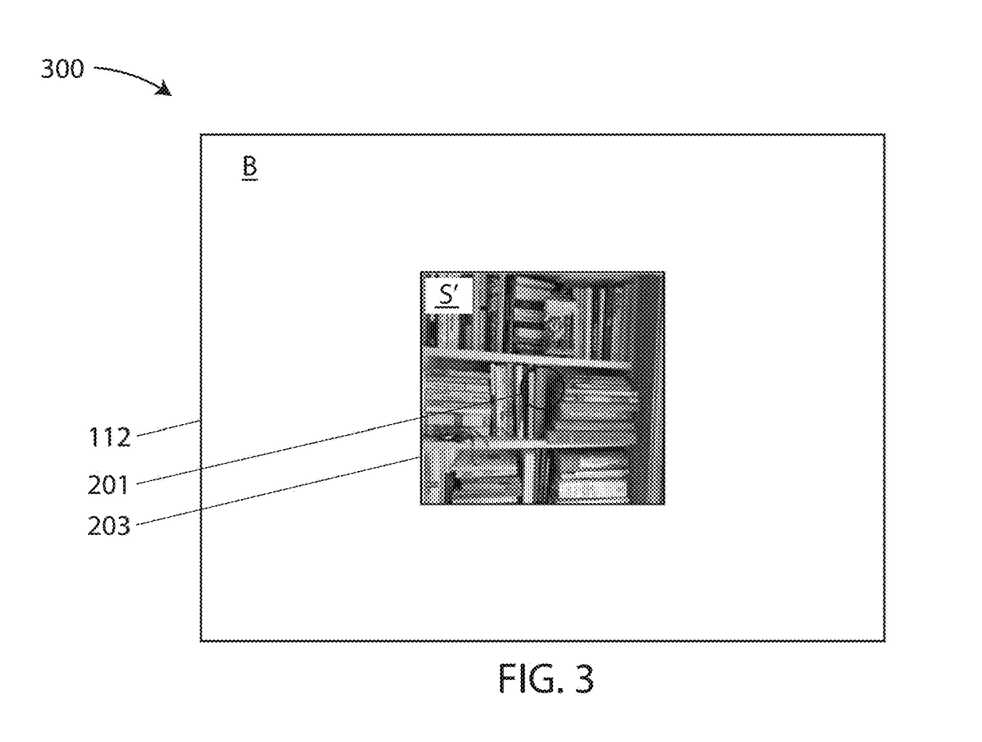
FIG. 3 shows a minified output image of the scene FIG. 2.

FIG. 3 illustrates a minified output image of the scene FIG. 2. In an illustrative example, VE App of the vision-enhancement system 100 is operated to place output images within output area 203 and is also programmed to accept input through input device 123, as discussed above, to control the size of output area 203 of display areas 112/114.

Thus, for example, one embodiment of system 100 performs a transformation or mapping of the output image S into output image 300, as shown in FIG. 3 and which may be, for example, one or both of display areas 112/114. In image 300, the user has manipulated input device 123 to select the size of output area 203. The unaltered output image, such as scene S, is reduced in size to fit within output area 203 and thus present a minified output image S', which is, in effect, output image S reduced in size and bounded by the output area 203. Due to the reduced area, an area B between output area 203 and area 112 does not contain the scene and may, for example, be colored black.

It will be appreciated that since display areas 112/114 are located at some specific distance from the user's eyes, output area 203 will thus occupy a visual field in proportion to the size of the output area. In one embodiment, output area 203 is smaller than area 112 and occupies a field of view that is less than or equal to 45 degrees, or, alternatively, to a field of view that is less than or equal to 35 degrees field. Thus, for example, output area 203 may occupy between 15 and 30 degrees when viewed by the user or may occupy 15 degrees, 20 degrees, 25 degrees, or 30 degrees.

FIG. 3 also shows, for reference, the user's visual field 201. The actual location of visual field 201 depends on where the user is looking. Thus, visual field 201 will move about output area 203 as the user directs their gaze to different portions of output area 203. As is apparent from comparing FIGS. 2 and 3, when output image S is minified as output image S', the angular size of the image is decreased and more of the original output image S falls within image user's visual field 201.

It will also be appreciated that output area 203 may be rectangular, as in the above embodiments, or may have a circular shape, or may be placed anywhere within image 300 as is appropriately tailored to a specific user's vision needs.

In addition to minifying the image, alternative embodiments include vision-enhancement system 100 programmed to enhance the light available in low light situations and reduce the intensity of light in bright light situations in response to the user's command.

Figure 4:
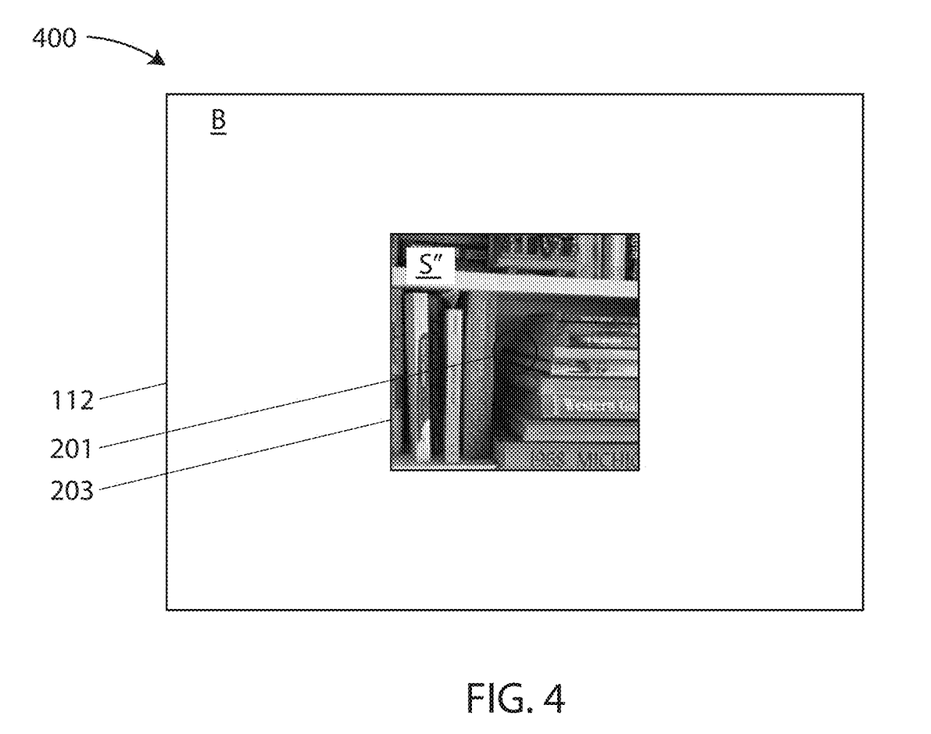
FIG. 4 shows a magnified minified output image of the scene of FIG. 3.

FIG. 4 shows a magnified minified output image of the scene of FIG. 3. In an illustrative example, VE App of the vision-enhancement system 100 is programmed to accept input through input device 123, as discussed above, to control the scale of output area 203 of display areas 112/114.

Thus, for example, FIG. 4, shows an image 400 which includes an output image S" within output area 203, where the output area is determined as described above with reference to FIG. 3. Output image S" is a magnified view of minified image S'—that is, S" is a magnified minified image. In certain embodiments, the magnification of the minified image is modified by the user through input device 123, as discussed above. In other words, the user may adjust the magnification of the minified image.

As is apparent from comparing FIGS. 3 and 4, magnifying a minified image permits the user wearing system 100 to see greater detail, which, in turn, facilitates reading and other activities.

In one embodiment, a VE App is provided to smartphone 110 which performs image processing on each image of the stream of video images and then presents each processed area simultaneously to areas 112 and 114. VE App may perform the following steps:

1) start the method, which runs continuously until stopped by the user.

2) capture images the scene. Images from stream of images are read from camera into memory. Depending on the architecture of the particular device and the capabilities and performance of the camera and the processing CPU, this may be done in one of two ways: a) read the entire image into memory and then process all pixels in the image, or b) read a collection of pixels (essentially a slice of the image) and process it while another slide is being read.

3) determine the size of the image output area 203. This may be preset in the VE App or may be controllable through input device 123.

4) minify the captured image to fit within output area 203 and optionally blacken the area between output area 203 and the edge of areas 112/114.

5) accept input from input device 123 to magnify the minified image.

Among the attributes of this embodiment are:
1. Dynamic control by the user of minification size of the field of view.
2. Dynamic control by the user of magnification within the field of view.
3. User control of these parameters that provides the patient with the power to control the incoming scene. These parameters will change depending upon what is being viewed, ranging from faces, to text, to theater events. The auto-focus camera assures that image will be in focus at all distances.
4. Use of the camera/display system to compensate for low light conditions, making the images bright enough for an RP patient to see in twilight.
5. Enclosure of the entire scene in a headset, eliminating excessive light and glare that are particularly troubling for the RP patient.

Each of the embodiments of the devices and methods described herein is in the form of a computer program that executes as an app on a smartphone. It will be appreciated by those skilled in the art, embodiments of the present invention may be embodied in a special purpose apparatus, such as a headset which contain the camera, processor, and screen, or some combination of elements that are in communication and which, together, operate as the embodiments described.

It will be understood that the steps of methods discussed are performed in one embodiment by an appropriate processor (or processors) of a processing (i.e., computer) system, electronic device, or smartphone, executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner as would be apparent to one of ordinary skill in the art from this disclosure in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A portable vision-enhancement system configured to be worn wearable by a user, wherein eyes of the user are impacted and diagnosed with a loss of peripheral vision due to retinitis pigmentosa by a clinician, said system comprising:
    a memory including a stored program;
    a camera mounted on said user aimed to view the scene in front of the user and operable to obtain input video images of said scene;
    a processor programmed to execute the stored program to change said input video images into a stream of output video images representative of the scene;
    a screen disposed to display said output video images for viewing by the user;
    a user-operable controller configured to generate an input to said processor by which the size of the output video images is adjusted, wherein the input is indicative of a visual field of the user and an extent of said loss of peripheral vision of the user,
    wherein, when said stored program is executed by said processor and the user operates said user-operable controller, a size of the output video images of the scene on the screen is adjusted such that an entirety of the scene fits within the visual field to thereby create minified output video images and wherein said output video images are presented to less impacted portions of the user's eyes; and
    a user-operable controller configured to zoom into the minified output video images,
    wherein the portable vision-enhancement system is configured by user-adjustable parameters of size, shape, magnification, and location of enhanced vision features, and one or more clinician-determined parameters selected from a group consisting of: an inter-pupillary distance, field of view, background dimming, and ambient light level.

2. The portable vision-enhancement system of claim 1, wherein the visual field is less than 35 degrees.

3. The portable vision-enhancement system of claim 1, wherein the visual field is between 15 and 30 degrees.

4. The portable vision-enhancement system of claim 1, wherein the visual field is less than 35 degrees, 15 degrees, 20 degrees, 25 degrees, or 30 degrees.

5. The portable vision-enhancement system of claim 1, further comprising:
    a user-operable controller for generating an input to said processor by which a magnification of the output video images is adjusted,
    such that, when said stored program is executed by said processor and the user operates said controller, the magnification of said output video images is changed within the adjusted size of said output video images.

6. The portable vision-enhancement system of claim 1, further comprising:
    a user-operable controller for generating an input to said processor by which a maximum light intensity of the output video images is adjusted,
    such that, when said stored program is executed by said processor and the user operates said controller, the intensity of light of said output video images is adjusted on said screen.

7. The portable vision-enhancement system of claim 1, further comprising a headset and an electronic device configured to be attached to said headset, wherein said camera, said processor, and said screen are components of said electronic device.

8. The portable vision-enhancement system of claim 7, wherein said electronic device is configured to be removably attached to said headset.

9. The portable vision-enhancement system of claim 7, wherein said electronic device is a smartphone.

10. A method for compensating for retinitis pigmentosa for a user using a system including a camera, a processor, and a screen, wherein eyes of the user are impacted and diagnosed with a loss of peripheral vision due to retinitis pigmentosa by a clinician, said method comprising:
    accepting a stream of video images from the camera, wherein the stream of video images is representative of a scene;
    processing the accepted stream of video images in the processor into a stream of output video images, wherein the stream of output video images is representative of the scene;
    accepting an input from the user, wherein the input is indicative of a visual field of the user having retinitis pigmentosa;
    adjusting a size of the output video images on the screen according to the accepted input such that an entirety of the scene fits within the visual field to thereby compensate for the user's retinitis pigmentosa by creating minified output video images and presenting said output video images to less impacted portions of the user's eyes; and
    zooming into the minified output video image,
    wherein the portable vision-enhancement system is configured by user-adjustable parameters of size, shape, magnification, and location of enhanced vision features, and one or more clinician-determined parameters selected from a group consisting of: an inter-pupillary distance, field of view, background dimming, and ambient light level.

11. The method of claim 10, wherein the visual field is less than 35 degrees.

12. The method of claim 10, wherein the visual field is between 15 and 30 degrees.

13. The method of claim 10, wherein the visual field is less than 35 degrees, 15 degrees, 20 degrees, 25 degrees, or 30 degrees.

14. The method of claim 10, further comprising:
accepting an input from the user to adjust a magnification of the size-adjusted output video images on the screen.

15. The method of claim 10, further comprising:
accepting an input from the user to adjust an intensity of light of the size-adjusted output video images on the screen.

16. The method of claim 10, wherein said camera, processor, and screen are contained in a smartphone.

* * * * *